United States Patent

Zima et al.

(10) Patent No.: US 7,107,162 B2
(45) Date of Patent: Sep. 12, 2006

(54) DETERMINING AN OPERATIONAL LIMIT OF A POWER TRANSMISSION LINE

(75) Inventors: Marek Zima, Baden (CH); Christian Rehtanz, Baden-Dättwil (CH); Mats Larsson, Baden (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 10/499,701

(22) PCT Filed: Dec. 11, 2002

(86) PCT No.: PCT/CH02/00682

§ 371 (c)(1),
(2), (4) Date: May 3, 2005

(87) PCT Pub. No.: WO03/055028

PCT Pub. Date: Jul. 3, 2003

(65) Prior Publication Data

US 2005/0222808 A1 Oct. 6, 2005

(30) Foreign Application Priority Data

Dec. 21, 2001 (EP) .................................. 01811254

(51) Int. Cl.
*G06F 19/00* (2006.01)

(52) U.S. Cl. ............... 702/65; 324/650; 324/691; 324/76.12; 307/87; 340/657

(58) Field of Classification Search ............... None
See application file for complete search history.

(56) References Cited

U.S. PATENT DOCUMENTS

| 4,413,325 A | | 11/1983 | Elfner et al. | |
|---|---|---|---|---|
| 5,181,026 A | * | 1/1993 | Granville | 340/870.28 |
| 6,236,949 B1 | * | 5/2001 | Hart | 702/64 |
| 6,313,752 B1 | * | 11/2001 | Corrigan et al. | 340/657 |
| 6,476,521 B1 | * | 11/2002 | Lof et al. | 307/105 |
| 6,545,482 B1 | * | 4/2003 | Fedirchuk et al. | 324/522 |
| 6,546,353 B1 | * | 4/2003 | Hallett et al. | 702/130 |
| 6,598,003 B1 | * | 7/2003 | Heino et al. | 702/68 |
| 6,618,684 B1 | * | 9/2003 | Beroset et al. | 702/99 |
| 6,662,124 B1 | * | 12/2003 | Schweitzer et al. | 702/65 |
| 6,675,100 B1 | * | 1/2004 | Hallett et al. | 702/3 |
| 6,694,270 B1 | * | 2/2004 | Hart | 702/57 |

(Continued)

FOREIGN PATENT DOCUMENTS

EP  0 795 944 A2  9/1997

(Continued)

OTHER PUBLICATIONS

Fehling, Heinz: "Elektrische Starkstromanlagan", 1983, VDE-VERLAG GMBH, Berlin-Offenbach XP002231902, pp. 91-104.

*Primary Examiner*—Patrick J. Assouad
(74) *Attorney, Agent, or Firm*—Buchanan Ingersoll & Rooney PC

(57) ABSTRACT

In a method, computer program and system for determining an operational limit of a power transmission line, time-stamped current phasor information and voltage phasor information for a first end and a second end of the line are determined, an ohmic resistance of the line is computed from the phasor information, and an average line temperature is computed from the ohmic resistance. This allows to determine the average line temperature without dedicated temperature sensors. The average line temperature represents the actual average temperature and is largely independent of assumptions regarding line parameters.

9 Claims, 2 Drawing Sheets

U.S. PATENT DOCUMENTS

| | | | |
|---|---|---|---|
| 6,708,133 B1* | 3/2004 | Hallett et al. | 702/130 |
| 6,711,521 B1* | 3/2004 | Hallett et al. | 702/130 |
| 6,845,333 B1* | 1/2005 | Anderson et al. | 702/65 |
| 6,940,702 B1* | 9/2005 | Kojovic et al. | 361/62 |
| 2001/0021896 A1* | 9/2001 | Bertsch et al. | 702/62 |
| 2002/0116139 A1* | 8/2002 | Przydatek et al. | 702/62 |
| 2003/0014678 A1* | 1/2003 | Ozcetin et al. | 713/400 |
| 2003/0101008 A1* | 5/2003 | Hart | 702/57 |
| 2003/0105608 A1* | 6/2003 | Hart | 702/122 |
| 2003/0200038 A1* | 10/2003 | Schweitzer et al. | 702/65 |
| 2003/0212512 A1* | 11/2003 | Hart | 702/57 |
| 2003/0220752 A1* | 11/2003 | Hart | 702/61 |
| 2004/0008461 A1* | 1/2004 | Kojovic et al. | 361/62 |
| 2004/0010350 A1* | 1/2004 | Lof et al. | 700/292 |
| 2004/0027748 A1* | 2/2004 | Kojovic et al. | 361/62 |
| 2004/0059469 A1* | 3/2004 | Hart | 700/291 |
| 2004/0133367 A1* | 7/2004 | Hart | 702/57 |
| 2004/0172207 A1* | 9/2004 | Hancock et al. | 702/60 |
| 2004/0186670 A1* | 9/2004 | Hart | 702/57 |
| 2005/0083206 A1* | 4/2005 | Couch et al. | 340/657 |
| 2005/0141682 A1* | 6/2005 | Wells | 379/90.01 |
| 2005/0251296 A1* | 11/2005 | Nelson et al. | 700/292 |

FOREIGN PATENT DOCUMENTS

| | | |
|---|---|---|
| JP | 09 200949 | 7/1997 |

* cited by examiner

DETERMINING AN OPERATIONAL LIMIT OF A POWER TRANSMISSION LINE

This disclosure is based upon Europe Application No. 01811254.0, filed Dec. 21, 2001, and International Application No. PCT/CH02/00682, filed Dec. 11, 2002, the contents of which are incorporated herein by reference.

FIELD OF THE INVENTION

The invention relates to large-scale electric power transmission networks, and, more particularly, to a method, a computer program and a system for determining an operational limit of a power transmission line according to the preamble of the independent claims.

BACKGROUND OF THE INVENTION

Electric power transmission and distribution systems or networks comprise high-voltage tie lines for connecting geographically separated regions, medium-voltage lines, and substations for transforming voltages and for switching connections between lines. Power generation and load flow in a network with several substations is controlled by an energy management system. For managing the network, it is desirable to determine a state of the network, in particular load flows and stability margins. Measurements of average RMS (root mean square) values of voltages, currents, active power and reactive power flowing in the network and/or measurements of voltage and current phasors are made at various places in the network and collected by substation automation (SA) systems and by a supervisory control and data acquisition (SCADA) system. In recent times, devices and systems for measuring voltage and current phasors at different locations of a network at exactly the same time and for collecting them at a central data processor have become available. Phasors collected from throughout the network in combination provide a snapshot of the electrical state of the network.

In order to maximally utilise a line, it is desirable to maximise the amount of transmitted power. This amount is limited by several factors, in particular a thermal limit and an electrical limit. Currently, these limits are taken into account by making assumptions about the electrical parameters of the line and by calculating a maximum power flow. A temperature of the line, which depends on weather conditions, may be measured by temperature sensors distributed along the line. Such measurements are however not representative for the entire line. Due to the shortcomings of existing systems, power lines are operated with overly conservative limits on transmitted power.

DESCRIPTION OF THE INVENTION

It is therefore an object of the invention to create a method, a computer program and a system for determining an operational limit of a power transmission line of the type mentioned initially, which allows to determine the operational limit with greater precision and to operate the line closer to an actual operational limit.

These objects are achieved by a method, a computer program and a system for determining an operational limit of a power transmission line according to the independent claims.

The inventive method for determining an operational limit of a power transmission line comprises the steps of determining time-stamped current phasor information and voltage phasor information for a first end and a second end of the line, computing an ohmic resistance of the line from the phasor information, computing an average line temperature from the ohmic resistance.

This allows to determine the average line temperature without dedicated temperature sensors. The average line temperature represents the actual average temperature and is largely independent of assumptions regarding line parameters.

An additional advantage is conferred by the fact that phasor measurements incorporate high resolution timing information. It is therefore also possible to obtain a much better temporal resolution for the temperature estimation than with measurements available through conventional SCADA systems. This better temporal resolution allows faster and better quality control of the line and the network.

The computer program for determining an operational limit of a power transmission line according to the invention is loadable into an internal memory of a digital computer, and comprises computer program code means to make, when said computer program code means is loaded in the computer, the computer execute the method according to the invention. In a preferred embodiment of the invention, a computer program product comprises a computer readable medium, having the computer program code means recorded thereon.

The system for determining an operational limit of a power transmission line according to the invention comprises a data processing device configured to determine time-stamped current phasor information and voltage phasor information for a first end and a second end of the line, compute an ohmic resistance R of the line from the phasor information, compute an average line temperature $T_1$ from the ohmic resistance R.

Further preferred embodiments are evident from the dependent patent claims.

BRIEF DESCRIPTION OF THE DRAWING

The subject matter of the invention will be explained in more detail in the following text with reference to the attached drawings.

DETAILED DESCRIPTION OF PREFERRED EMBODIMENTS

Figure 1:
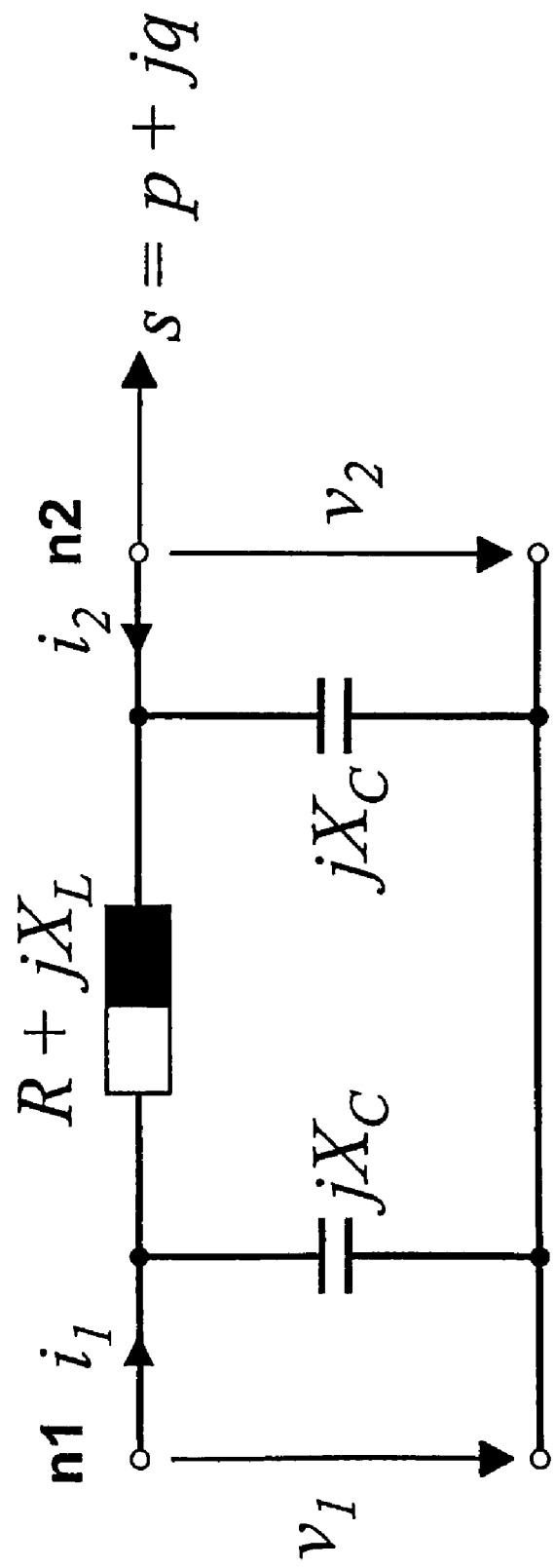
FIG. 1 illustrates an equivalent circuit for a transmission line in accordance with an exemplary embodiment of the present invention.

FIG. 1 shows an equivalent circuit for a transmission line. The circuit is a standard π-equivalent circuit for a transmission line or line segment connecting a first node n1 of the network with a second node n2. A complex variable representing a voltage phasor $v_1$ corresponds to the voltage at the first node n1, i.e. at a first end of the line, and a complex variable representing a current phasor $i_1$ corresponds to the current flowing into the line from the first end. In analogy, a voltage phasor $v_2$ and current phasor $i_2$ are associated with the second end of the line. The line is represented by electrical line parameters, that is, a line impedance $R+jX_L$ and shunt admittances $jX_C$. A power flow s into the second node n2 comprises a real part p and imaginary part jq.

Phasor data is determined with a phasor measurement unit (PMU) residing, for example, at a feeder at the bay level of substations or at branching points along transmission lines. A voltage phasor represents, for example, a voltage of the feeder or line, while a current phasor represents current flowing through the feeder or line. A phasor may also be used to represent electric power.

The phasor data represents a phasor and may be a polar number, the absolute value of which corresponds to either the real magnitude or the RMS value of a quantity, and the phase argument to the phase angle at zero time. Alternatively, the phasor may be a complex number having real and imaginary parts or the phasor may use rectangular or exponential notation. By contrast, conventional sensing devices used in power networks generally measure only scalar, average representations, such as the RMS value of a voltage, current etc.

Figure 2:
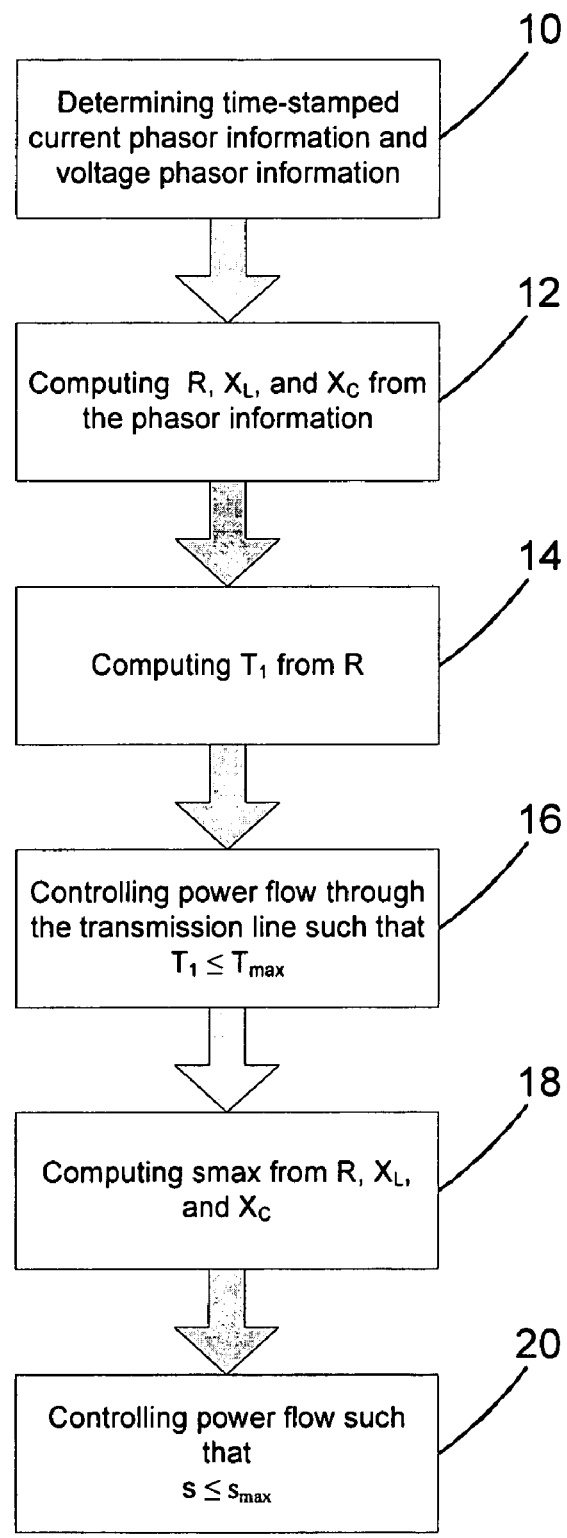
FIG. 2 is a flowchart illustrating a process for determining an operational limit of a power transmission line in accordance with an exemplary embodiment of the present invention.

FIG. 2 is a flowchart illustrating a process for determining an operational limit of a power transmission line in accordance with an exemplary embodiment of the present invention. In Step 10, time stamped current phasor information and voltage phasor information for the first end and a second end of the transmission line is collected from phasor measurement units that are distributed over a large geographic area, i.e. over tens to hundreds of kilometres. Since the phasor data from these disparate sources are analysed in conjunction, they must refer to a common phase reference. Therefore, the different phasor measurement units must have local clocks that are synchronised with each other to within a given precision. Such a synchronisation of the phasor measurement units is preferably achieved with a known time distribution system, for example the global positioning (GPS) system. In a typical implementation, the phasor data 9 is determined at least every 200 or every 100 or preferably every 40 milliseconds, with a temporal resolution of preferably less than 1 millisecond. In a preferred embodiment of the invention, the temporal resolution is less than 10 microseconds, which corresponds to a phase error of 0.2 degrees. Each measurement is associated with a time stamp derived from the synchronised local clock. The phasor data therefore comprises time stamp data.

In another preferred embodiment of the invention, phasor information such as a voltage phasor and a current phasor associated with a node or line is not measured at said node or line, but is inferred from phasor measurements made at a location that is remote from said node or line. For example, with regard to FIG. 1, if the electrical line parameters are known and $v_1$ and $i_1$ at the first node n1 are measured with a PMU, then $v_2$ and $i_2$ at the second node n2 can be computed. In the context of the present invention, this makes sense only if the line whose electrical parameters are assumed to be known and are used to compute phasors at a location that is remote from the PMU is not identical to the line whose electrical parameters and/or temperature need to be estimated.

In step 12, the electric line parameters, R, $X_L$, and $X_C$, or at least the ohmic resistance R of the line, i.e. the real part R of the line impedance $Z=R+jX_L$ are determined from measured or computed phasor information representing some or all of the voltage and current phasors at the two ends of line.

In a first preferred variant of the invention, it is assumed that the shunt capacitance $jX_C$ remains essentially constant during power line operation and is known from other measurements, design parameters or calculations. This is a valid assumption, since changes in shunt capacitance $jX_C$ are relatively small when compared to the ohmic resistance R. Then it is necessary to determine only the two voltage phasors $v_1$ and $v_2$ at either end of the line and one of the current phasors $i_1$ or $i_2$. Let $i_1$ be measured. Then the impedance Z is $$Z = \frac{v_1 - v_2}{i_1 - v_1 \cdot jX_C}$$

and the desired ohmic resistance R is the real part of Z.

In a second preferred variant of the invention, no assumption on shunt impedances is made, and the two voltage phasors $v_1$ and $v_2$ and the two current phasors $i_1$ or $i_2$ are measured or determined from measurements. Determining the actual electrical line parameters R, $X_L$, $X_C$ from these measurements is common knowledge. Since resulting equations for the electrical line parameters are non-linear, numerical methods such as Newton-Raphson approximation are used for determining actual parameter values. The resulting line parameters are actual values in that they are determined online and represent the actual state of the power line, in contrast to average values that are assumed to be constant over all seasons and ambient conditions.

In step 14, the average line temperature T1 is computed from the ohmic resistance R by modeling a relationship between temperature and resistance as linear, i.e.

$$R=R_2+\alpha(T_1-T_2)$$

or as quadratic, i.e.

$$R=R_2+\alpha(T_1-T_2)+\beta(T_1-T_2)^2$$

where $R_2$ and $T_2$ are known reference restance and temperature values dependent on the construction of the line and $\alpha$ and $\beta$ are material constants for the line cables. The linear relationship is typical for common conductor materials such as copper or aluminium. As an example, the parameter values are such that for a line temperature change of $\Delta T=30°$ C. the resistance changes by about $\Delta R=12\%$. The equation for the chosen relationship is solved for $T_1$, which gives the desired average line temperature.

Since the temperature of the line may, according to location along with the line, differ from the average line temperature $T_1$, in Step 16 the power flow through the line is regulated such that a predetermined maximum average line temperature $T_{max}$ is not exceeded. Such a regulation or control regime is implemented with any commonly known control method such as PID control, non-linear control, model predictive control, . . . etc.

In Step 18, the maximum load $S_{max}$ is determined based on a limit to the power delivered through the line which is computed from the phasor information $v_1$, $v_2$, $i_1$, $i_2$. This is done by solving the well-known load flow equation $$p - jq = v_2^* \cdot \left( \frac{v_1 - v_2}{R + jX_L} - \frac{v_2}{jX_C} \right)$$

where $v_2^*$ is the complex conjugate of $v_2$. Assuming that $v_1$ is constant and given by a power source or generator at the first node n1, and that consumed power s corresponding to a load at the second node n2 is varied, then there are either two, one or no solutions of the load flow equation for $v_2$. For an increasing load, the power at which there is no solution anymore corresponds to a maximum load $s_{max}$. This is the maximum amount of power that can be delivered by the line to the second node n2 before the line becomes unstable and the voltage $v_2$ collapses. Since the ohmic resistance R plays an important role in the load flow equation, the maximum load $s_{max}$ depends on actual line conditions, in particular on the line temperature. Determining the maximum load $s_{max}$ according to the invention gives an actual maximum value that allows a less conservative approach than when a maximum load is given and remains constant over a wide range of operating conditions.

Depending on impedance characteristics of the load, power flow is maximised by increasing power flow until the maximum load $s_{max}$ is reached. In Step 20, the power is controlled to increase only until a given safe distance from the maximum load $s_{max}$ is reached. In both cases, according to operator preferences, the load and maximum load are either considered as complex variables, or only the real parts are considered.

If the load has a fixed p/q relationship, then active power p and reactive power q delivered to the load are increased together. If reactive power q of the load is constant, then the active power p is increased alone. As an example, a change of the line resistance $\Delta R$ of 10% leads to a loadability change of $\Delta s_{max}=6.5\%$ for a typical 400 kV line. In the conventional offline worst-case analysis the lower limit has to be considered because R is seen as fixed. With the online approach the loadability can be increased by up to the calculated value, dependent on actual ambient conditions.

In a system according to the invention, the system comprises means for determining phasor information that are configured to receive time-stamped measured phasor data from at least two PMUs located throughout the network, and optionally means for computing phasor information for at least one node from measured phasor data corresponding to other nodes. The system further comprises means for computing an ohmic resistance R of the transmission line from the measured and/or computed phasor information and for computing an average line temperature $T_1$ from the ohmic resistance R.

The invention claimed is:

1. A method for determining an operational limit of a power transmission line, comprising the steps of
    determining time-stamped current phasor information and voltage phasor information for a first end and a second end of the line,
    computing an ohmic resistance R of the line from the phasor information,
    computing an average line temperature $T_1$ from the ohmic resistance R.

2. The method according to claim 1, comprising the step of controlling a power flow through the line such that the average line temperature $T_1$ does not exceed a given maximum average line temperature $T_{max}$.

3. The method according to claim 1, comprising the steps of computing actual electrical parameters (R, $X_L$, $X_C$) of the line and computing, from the actual electrical line parameters, a maximum load $s_{max}$ that is deliverable by the line.

4. The method according to claim 3, comprising the step of controlling a power flow through the line such that an actual power s delivered by the line does not exceed the maximum load $s_{max}$.

5. The method according to claim 4, wherein the step of controlling a power flow through the line ensures that the average line temperature $T_1$ does not exceed a given maximum average line temperature $T_{max}$.

6. A computer program for determining an operational limit of a power transmission line loadable into an internal memory of a digital computer, comprising computer program code means to make, when said program is loaded in the computer, the computer execute the method according to claim 1.

7. A system for determining an operational limit of a power transmission line from time-stamped current phasor information and voltage phasor for a first end and a second end of the line, the system comprising:
    a data processing device and means for
    computing an ohmic resistance R of the line from the phasor information, and
    computing an average line temperature $T_1$ from the ohmic resistance R.

8. The system according to claim 7, further comprising:
    means for controlling power flow through the line such that the average line temperature $T_1$ does not exceed a given maximum average line temperature $T_{max}$.

9. The system according to claim 7, further comprising:
    means for computing actual electrical parameters (R, $X_L$, $X_C$) of the line; and
    means for computing, from the actual electrical line parameters, a maximum load $s_{max}$ that is deliverable by the line.

* * * * *